United States Patent [19]

Kondo

[11] Patent Number: 4,818,046
[45] Date of Patent: Apr. 4, 1989

[54] LIGHT BEAM SCANNING DEVICE
[75] Inventor: Hirohito Kondo, Setagaya, Japan
[73] Assignee: Kyocera Corporation, Kyoto, Japan
[21] Appl. No.: 124,921
[22] Filed: Nov. 24, 1987
[30] Foreign Application Priority Data Dec. 3, 1986 [JP] Japan .................. 61-286717

[51] Int. Cl.[4] .......................................... G02B 26/10
[52] U.S. Cl. ...................................... 350/6.8; 350/6.1; 350/6.91; 250/236
[58] Field of Search .............. 350/6.5, 6.6, 6.7, 6.8, 350/481, 6.1, 6.2, 6.9, 6.91; 250/234, 235, 236

[56]        References Cited
         U.S. PATENT DOCUMENTS

| 4,523,801 | 6/1985 | Baba et al. ............... | 350/6.8 |
| 4,707,085 | 11/1987 | Takanashi et al. ........ | 350/6.8 |
| 4,715,699 | 12/1987 | Morimoto .................. | 350/6.8 |

FOREIGN PATENT DOCUMENTS

| 0022218 | 2/1982 | Japan ...................... | 350/6.8 |
| 0144516 | 9/1982 | Japan ...................... | 350/6.8 |

Primary Examiner—John K. Corbin
Assistant Examiner—Loha Ben
Attorney, Agent, or Firm—Spensley, Horn Jubas & Lubitz

[57] ABSTRACT

The invention provides a light beam scanning device in which an f-$\theta$ lens system is constituted by two single lenses, a cylindrical lens having a refractive power in only a deflection plane is located at the side of a deflective reflecting surface, and a toric lens including a surface having a negative refractive index at the side of the deflective reflecting surface and including a surface having a positive refractive power at the side of a surface to be scanned in a sectional plane perpendicular to the deflection plane is located at the output side of the cylindrical lens, thereby realizing scanning at a constant speed of an image-forming beam while preventing pitch variations in the beam and image surface curvature thereof on the surface to be scanned. More particularly, the invention provides a light beam scanning device in which a plastic lens can be used as the cylindrical lens.

4 Claims, 5 Drawing Sheets

LIGHT BEAM SCANNING DEVICE

BACKGROUND OF THE INVENTION

1. Field of the Invention

The present invention relates to a light beam scanning device in which a f-$\theta$ lens system is disposed such that a deflective reflecting surface and a surface to be scanned are set in an optical conjugate relationship, and a linear convergent light beam which is deflected at a constant angular speed by the deflective reflecting surface is transmitted through the f-$\theta$ lens system to be converted at a constant speed and then is focused on the scanning surface.

2. Description of the Prior Art

A light beam scanning device to which the present invention is applied is arranged as shown in FIG. 1A. That is, a laser beam or another light beam 1 which is modulated in correspondence to input information is transmitted through a collimating lens system or another lens system 2 and then incident as a parallel linear convergent light beam on a deflective reflecting surface 3. The light beam 1 is deflectively reflected at a constant angular speed by the deflective reflecting surface 3 and then incident on an image-forming lens system 4 (to be referred to as an f-$\theta$ lens system hereinafter) having f-$\theta$ characteristics to be converted into constant-speed motion. Thereafter, the resultant light beam 1 is focused on a surface to be scanned 5 of, e.g., a photosensitive drum located at a focal point of the light beam 1 and scans the scanning surface 5, thereby forming an electrostatic latent image corresponding to image information on the scanning surface 5. (Note that the shapes of two lenses 41 and 42 which constitute the image-forming lens system 4 are portions according to the present invention and hence are not the prior art.)

A device of this type is already known. In such a device, a rotatory polygonal reflecting mirror 30 which rotates at a constant speed about a rotating shaft 3A supported in a direction perpendicular to a deflection plane is generally used as the deflecting means. However, according to such a deflecting means, inclination tends to occur in a direction perpendicular to the deflection plane by small errors between the vertical axis of the reflecting mirror 30 and the rotating shaft 3A and between the rotating shaft 3A and the deflective reflecting surface 3, and this inclination appears as beam pitch variations on the scanning surface 5.

The above pitch variations can be eliminated by using the f-$\theta$ lens system 4 in which the deflective reflecting surface 3 and the scanning surface 5 are set in the optical conjugate relationship.

Accordingly, in such f-$\theta$ lens system 4, a deflection plane (to be referred to as an X plane hereinafter) by which the light beam 1 is deflected and a sectional plane (to be referred to as a Y plane hereinafter) perpendicular to the deflection plane must have different optical characteristics, and scanning surface at a constant speed of the beam must be realized while preventing the pitch variations and image surface curvature of the beam on the scanning surface 5. Since it is difficult to constitute such a lens system by a single lens, a plurality of lenses are normally used.

For example, the following technique is disclosed in Japanese Unexamined Patent Publication (Kokai) No. 50-93720. That is, in this technique (to be referred to as a first prior art hereinafter), a lens having distortion characteristics for realizing conversion at a constant speed is disposed at the side of the deflective reflecting surface 3, and in order to eliminate the pitch variations in the light beam to be focused on the scanning surface 5 to scan the surface, a cylindrical lens having refractive power in the Y-plane direction is disposed at the side of the scanning surface, hereby realizing conversion at a constant speed of the beam and preventing the pitch variations. However, when such an arrangement is adopted, the beam subjected to conversion at a constant speed is transmitted through the cylindrical lens again. Therefore, as the cylindrical lens is disposed closer to the deflective reflecting surface 3, the image surface curvature tends to occur more often.

Accordingly, in the above arrangement, a good image with less image surface curvature cannot be obtained unless the cylindrical lens is disposed closer to the scanning surface 5.

However, in order to dispose the cylindrical lens closer to the scanning surface 5, the cylindrical lens must be elongated in a deflecting direction in correspondence to a scanning width. As a result, it becomes difficult to achieve high manufacturing and assembly accuracies, and the f-$\theta$ lens system is undesirably enlarged.

In order to eliminate the above drawbacks, for example, the following technique is disclosed in Japanese Unexamined Patent Publication (Kokai) No. 56-36622. That is, as shown in FIG. 5, according to this technique (to be referred to as a second prior art hereinafter), a spherical lens 43 and a toric lens 44 are disposed sequentially from the deflective reflecting surface 3 toward the scanning surface 5, and the f-$\theta$ lens system 4 is constituted by the two lenses. Note that the toric lens 44 is a lens having a positive or negative power in each of X- and Y-plane directions in a surface perpendicular to an optical axis of the lens and having different powers in the X- and Y-plane directions.

In order to minimize the side of (flatten) such a device, a lens is preferably formed flat to reduce a lens width (height) in the Y-plane direction. However, if the spherical lens 43 is to be used, it is very difficult to polish a lens material which is cut out flat. Therefore, as shown in FIG. 6, a polished spherical lens 43A is cut parallel to its optical axis so as to obtain a rectangular portion, and only this rectangular central portion 43 is used.

However, since only part of the polished spherical lens 43A is used, a manufacturing cost is naturally increased, making it difficult to realize cost decreases. In addition, it is difficult to cut the spherical lens 43a parallel to the optical axis, and a manufacturing error is often generated.

Since both lenses 43 and 44 have the refractive power in both the X- and Y-plane directions, they must be disposed at predetermined positions so that their optical axes coincide with each other in both the X- and Y-plane directions. As a result, assembly and adjustment become troublesome and may cause an assembly error to occur.

SUMMARY OF THE INVENTION

The present invention has been made in consideration of the above conventional drawbacks, and has as its object to provide a light beam scanning device which can realize scanning at a constant speed of a beam while preventing pitch variations of the beam focused on a surface to be scanned and image surface curvature.

It is another object of the present invention to provide a light beam scanning device which can be easily manufactured and assembled and in which a f-θ lens system can be made compact.

It is still another object of the present invention to provide a light beam scanning device in which at least one of lenses can be formed of a plastic material, thereby further reducing manufacturing cost.

In order to achieve the above objects, as shown in FIGS. 1A to 1C, there is provided a light beam scanning device characterized in that:

1- the f-θ lens system 4 is constituted by two single lenses 41 and 42, both of which are preferably disposed closer to the deflective reflecting surface 3 than to the scanning surface 5;

2- of the two single lenses 41 and 42, the first lens 41 located at the side of the deflective reflecting surface 3 is a cylindrical lens having a refractive power in only the X plane (i.e., not having a refractive power in the Y-plane direction), the lens 41 preferably having a negative power in the X plane; and 3- the second lens 42 located at the output side of the lens 41 is a toric lens 42 including a surface having a negative refractive power in the Y plane at the side of the deflective reflecting surface 3 and a surface having a positive refractive power in the Y plane at the side of the scanning surface 5.

An operation of the present invention characterized as described above will be described below in comparison with conventional techniques.

In the above first prior art, the f-θ lens system 4 is constituted by combining two single lenses. Since one of the two single lenses is a cylindrical lens not having a refractive power in the X plane, only the first lens located at the incident side and having the distortion characteristics realizes scanning at a constant speed. However, it is difficult to realize scanning at a constant speed by only a single lens in terms of design and manufacture.

Similarly, in the second prior art, the f-θ lens system 4 is constituted by combining two single lenses. In this case, one of the two single lenses is the toric lens 44 having free power and refractive power in both the X- and Y-plane directions, and the other thereof is the spherical lens 43 having the same power and refractive power in both the X- and Y-plane directions. Therefore, scanning at a constant speed can be realized more easily than by the first prior art. However, in order to maintain the conjugate relationship between the deflective reflecting surface 3 and the scanning surface 5, a single lens must be adjusted by combination of the spherical lens 43 having the same power and refractive power in both the X- and Y-plane directions and the toric lens 44. Therefore, although the toric lens 44 has the free power and refractive power in the Y-plane direction, lens design of the toric lens 44 becomes complicated to maintain the conjugate relationship in the Y plane in a lens system constituted by a plurality of lenses each having the refractive power. In addition, a skill is required to precisely select and adjust a distance between the lenses, a positional relationship between the deflective reflecting surface 3 and the scanning surface 5, and the like. Moreover, in order to realize scanning at a constant speed, a desired refractive power of the spherical lens 43 in combination with the toric lens 44 must be selected while maintaining the conjugate relationship in the Y plane, i.e., while being subjected to limitation in the other direction. As a result, lens design of the spherical lens 43 also becomes complicated.

According to the present invention, when the f-θ lens system 4 is constituted by the cylindrical lens 41 having the refractive power in only the X plane and the toric lens 42 which can be freely designed to have different refractive powers in the X- and Y-plane directions, a free refractive power can be easily set without limitation in the other direction, thereby realizing scanning at a constant speed using the two lenses 41 and 42. Therefore, scanning at a constant speed can be easily realized without skill in terms of both design and precision in manufacture and assembly.

In addition, the conjugate relationship between the deflective reflecting surface 3 and the scanning surface 5 in the Y plane can be easily maintained by freely setting a refractive power of the toric lens 42 in the Y plane independently of that in the X plane and by positioning the toric lens 42 in the device without need for adjustment of lenses 41 and 42 in the Y plane. Therefore, no difficulty is required in terms of both design and precision in manufacture and assembly.

Therefore, according to the present invention, prevention of the pitch variations and the image surface curvature, scanning at a constant speed of a beam, and the like can be easily and precisely realized without difficulty in design.

In addition, according to the present invention, a beam converted at a constant speed need not be transmitted through another lens again to realize scanning at a constant speed by the two lenses 41 and 42. Therefore, if the entire lens system is disposed close to the deflective reflecting surface 3, an increase in image surface curvature can be prevented.

As a result, according to the present invention, the entire f-θ lens system 4 can be located close to the deflective reflecting surface 3 while preventing the image surface curvature in the X plane. Therefore, a scanning direction length at the output side of the f-θ lens system can be largely reduced as compared with that in the convention techniques, so that compactness of the light beam scanning device in the X-plane direction can be easily achieved.

Furthermore, according to the present invention, since the first lens 41 having the refractive power in only the X plane, i.e., having a curvature surface in only one direction is used and compactness of the device can be achieved, a longitudinal dimension of the device need not be uselessly increased. Therefore, as shown in FIG. 2, by forming or manufacturing/polishing the lens material 41A extending in a direction of the deflective reflecting surface 3 and then cutting it in a direction perpendicular to the deflective reflecting surface 3 to obtain a rectangular part, a large number of lenses 41 can be manufactured in a mass-production manner, thereby largely reducing manufacturing cost.

Therefore, according to such a manufacturing method, lenses can be efficiently manufactured since no output piece as in the second prior art is produced, thereby reducing the manufacturing cost. In addition, since the curvature surface is present in only one direction, a cutting operation need only be performed in consideration of only inclination of a sectional plane to be cut, resulting in high cutting precision.

Moreover, in a preferred embodiment of the present invention, the cylindrical lens 41 has a negative power and the toric lens 42 has a positive power in the X plane (direction). Therefore, scanning at a constant speed can be assured and image surface curvature in the X plane (direction) can be further prevented, thereby forming a good image-forming beam in the X-plane direction.

That is, in order to reduce the image surface curvature, Petzval sum P need only be set close to 0. Since the Petzval sum P is given by the following equation, the image surface curvature can be reduced by constituting the f-θ lens system 4 by two single lenses consisting of a combination of a lens having a positive power and that having a negative power, and this arrangement is the same as in the first prior art:

$$P = (\psi_1/n_1) + (\psi_2/n_2)$$

where $\psi_1$ and $\psi_2$: power values of lenses; and $n_1$ and $n_2$: refractive indexes.

However, in the first prior art, since the lens having the positive power is disposed at the side of the deflective reflecting surface 3 and the lens having the negative power is disposed at the side of the scanning surface 5, it is difficult to assure scanning at a constant speed.

This will be well understood by examining distortion aberration at the side of the scanning surface 5 which corresponds to scanning at a constant speed.

In order to reduce the distortion aberration, the power value $\psi$ of a lens need only be reduced. However, when the arrangement of the first prior art in which the [positive power lens]—the [negative power lens] are sequentially disposed from the deflective reflecting surface 3 is compared with that of the present invention in which the [negative power lens]—the [positive power lens] are sequentially disposed from the deflective reflecting surface 3, in order to obtain the same scanning width (generatrix length), i.e., the same refracting effect, the power values $\psi$ of the respective lenses, especially that of the positive power lens must be increased larger in the former arrangement than in the latter arrangement. As a result, the distortion aberration can be made smaller in the latter arrangement (present invention), thereby assuring scanning at a constant speed.

Furthermore, in order to use a plastic material as a first lens material as will be described later in reference to the effects of the invention, the refractive index $n_1$ of the first lens material must be set smaller than the refractive index $n_2$ of a second lens material, and the present invention can be applied to such a case without a problem.

The cylindrical lens 41 does not have a refractive power in a direction perpendicular to the X plane. However, since the second lens located at the output side of the cylindrical lens 41 is the toric lens 42, an image-forming relationship (focal length) different from that in the X plane (direction) can be obtained in the Y-plane direction. Therefore, sagittal image surface curvature can be prevented to form a good image-forming beam, and the deflective reflecting surface 3 and the scanning surface 5 can be easily set in the optical conjugate relationship. As a result, the pitch variations caused by inclination of the deflective reflecting surface 3 can be easily prevented.

In this case, since the toric lens 42 includes, in the X plane, a surface having a negative refractive power in the Y plane at the side of the deflective reflecting surface 3, the sagittal image surface curvature can be corrected more effectively to form a good image-forming spot.

In addition, since the toric lens 42 includes a surface having a positive refractive power in the Y plane at the side of the scanning surface 5, a conjugate point on the axis at which a paraxial magnification becomes 1 can be moved closer to the deflective reflecting surface 3. As a result, compactness can be easily achieved and the conjugate relationship can be easily maintained.

Moreover, since the curvature surface is present in only one direction, even if the toric lens 42 is formed of a plastic material, its incident and output surfaces can be easily manufactured with high precision.

In this case, a focal length of the plastic lens varies as a temperature varies because of a change in refractive index caused by a temperature change and a curvature change caused by thermal expansion. The smaller the curvature is, the larger the relative curvature as a result of thermo expansion would be. Therefore, the cylindrical lens 41 of the present invention in which the radius of curvature R in the Y-plane direction is set to be $\infty$ is advantageous.

Therefore, according to only the present invention, the first lens 41 can be formed of a plastic material while maintaining predetermined manufacture precision and optical characteristics, thereby further reducing manufacturing cost.

In addition, since the first lens 41 has a refractive power in only the X-plane direction but does not have a refractive power in a direction perpendicular to the X plane, no optical axis error is generated in the Y plane. Therefore, during assembly of the device, since only inclination of the optical axis need be paid attention to, assembly adjustment can be easily performed and an assembly error rarely occurs.

Note that other effects of the present invention will become more apparent from the following description of an embodiment.

BRIEF DESCRIPTION OF THE DRAWINGS

FIGS. 1A to 1C are schematic views showing an arrangement of a light beam scanning device according to an embodiment of the present invention, in which FIG. 1A is a perspective view, FIG. 1B is a plan view showing an arrangement of a lens system in a scanning direction, and FIG. 1C is a front view showing an arrangement of a lens system in a direction perpendicular to the scanning direction;

FIGS. 5 and 6 show a conventional technique, in which FIG. 5 is a front view showing an arrangement of a lens system in a direction perpendicular to a scanning direction, and FIG. 6 is a perspective view showing manufacturing process of an f-θ lens of this conventional technique.

DETAILED DESCRIPTION OF THE PREFERRED EMBODIMENTS

Preferred embodiments of the present invention will be described in detail with reference to the accompanying drawings. Note that sizes, materials, shapes, relative positions, and the like of the respective parts used in the embodiments are not limited to those described therein, unless otherwise specified, but are merely examples.

Figure 1A:
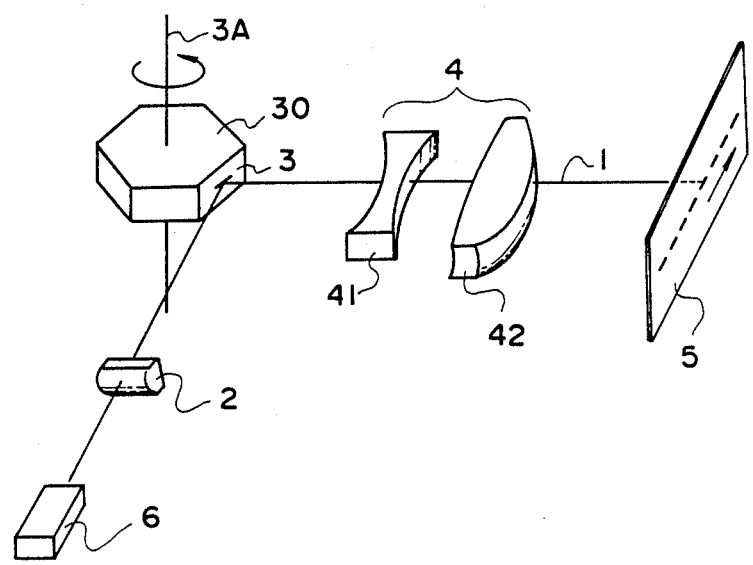
Figure 2:
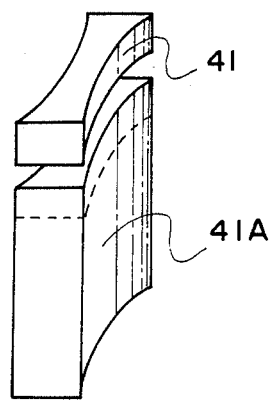
FIG. 2 is a perspective view showing manufacturing process of a cylindrical lens which constitutes an f-θ lens of the embodiment.
Figure 1B:
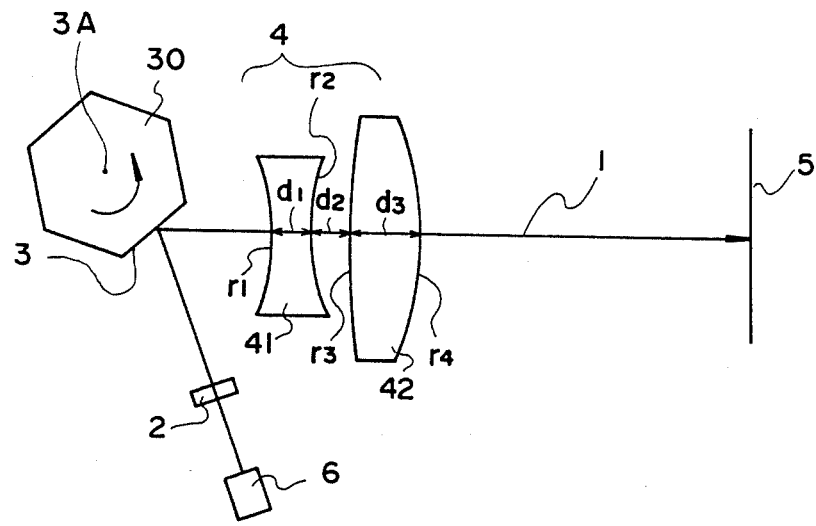
Figure 1C:
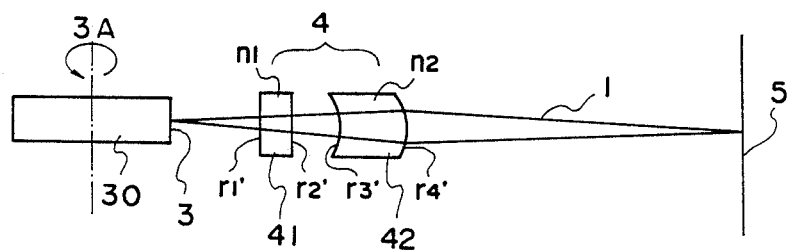
Figure 3:
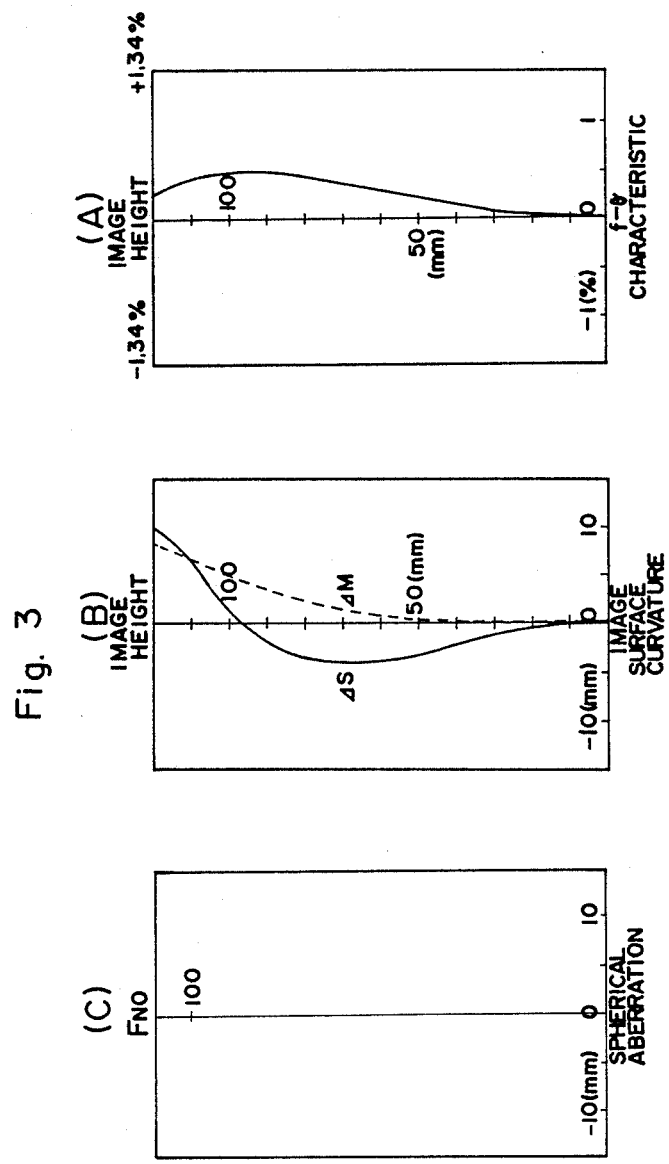
FIGS. 3(A) to 3(C) and 4(A) to 4(C) are aberration diagrams of the respectively first and second embodiments (to be specified later). respective embodiments.
Figure 4:
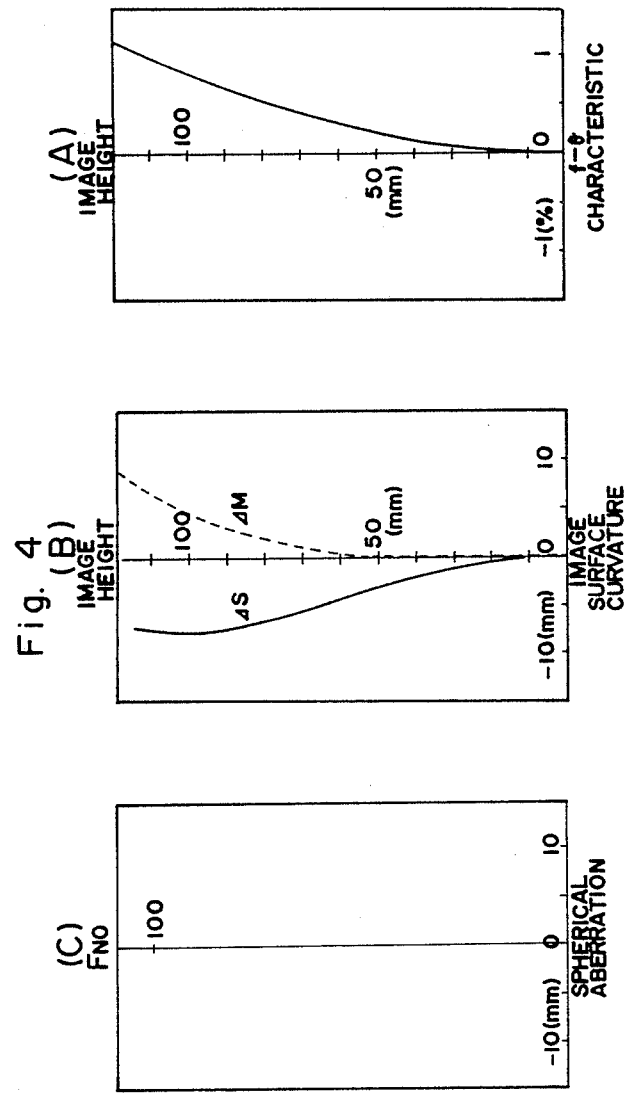
Figure 5:
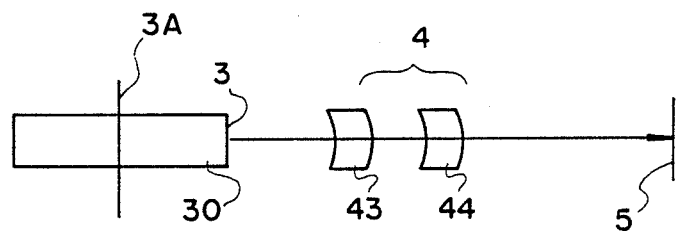
Figure 6:
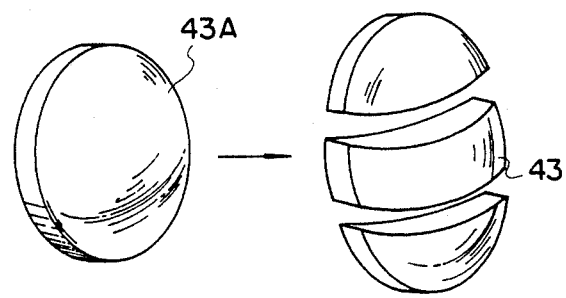

FIGS. 1A to 1B are schematic views of a light beam scanning device according to an embodiment of the present invention. An arrangement of this device will be briefly described below.

Reference numeral 6 denotes a semiconductor laser for emitting a light beam 1 which is modulated in correspondence to input information. The wavelength λ of the semiconductor laser 6 is set at 780 nm. Reference numeral 2 denotes a collimating lens which collimates the light beam 1 emitted from the semiconductor laser 6 and outputs a parallel linear convergent light beam on a deflective reflecting surface 3. The deflective reflecting surface 3 of a polygonal mirror 30 rotating about a rotating shaft 3A at a constant speed is hexagonal or octagonal in shape. Reference numeral 4 denotes an f-θ lens system consisting of two lenses, i.e., a cylindrical lens 41 formed of a plastic or glass material and a toric lens 42 formed of a glass material. The cylindrical lens 41 is disposed between deflective reflecting Surface 3 and toric lens 42 so as to receive a light beam reflected from deflective reflecting Surface 3. Reference numeral 5 denotes a surface to be scanned such as a photosensitive drum on which a scanning beam at a constant speed transmitted through the f-θ lens system is focused to scan the surface.

A distance between the deflective reflecting surface 3 and the scanning surface 5 is set to be 279.3 mm in a first embodiment and 297.1 mm in a second embodiment both to be described later, respectively. The lenses 41 and 42 constituting the f-θ lens system 4 are disposed closer to the deflective reflecting surface 3 than to the scanning surface 5. That is, a distance from the deflective reflecting surface 3 to the cylindrical lens 41 is set to be 24 mm in either of the first and second embodiments, and that with respect to the toric lens 42 is 39.8 mm in the first embodiment and 64 mm in the second embodiment, respectively.

As a result, the f-θ lens system 4 is disposed at a position ⅓ or less, and preferably ¼ or less of a distance between the deflective reflecting surface 3 and the scanning surface 5, i.e., the f-θ lens system 4 is disposed closer to the deflective reflecting surface 3 and hence can be made compact. In addition, when, e.g., a generatrix length at the side of the scanning surface 5 is so set as to correspond to A-4 size, a longitudinal dimension of the cylindrical lens 41 can be reduced to 20 to 40 mm, i.e., ¼ or less, and preferably 1/10 to 1/5 of the generatrix length. Therefore, a plastic material can be molded more precisely.

Tables 1 and 2 show the first and second embodiments of an optical system according to the present invention, respectively. Table 1 shows a case in which the cylindrical lens 41 is formed of a glass material; and Table 2, the cylindrical lens 41 is formed of a plastic material. FIGS. 3(A) to 4(C) show the f-θ characteristic, the image surface curvature, and the like of the respective embodiments.

Note that in the following Tables, reference symbols r1 to r4 denote radii of curvatures of the lenses 41 and 42 in the X-plane; r1' to r4', radii of curvatures (mm) of the lenses 41 and 42 in a direction perpendicular to the X plane: $d_1$ to $d_3$, axial thicknesses of the lenses and a distance between the lenses (mm); and $n_1$ and $n_2$, the refractive index of the lens material.

TABLE 1

(Embodiment 1) of f-θ Lens System

| | | | | | | | |
|---|---|---|---|---|---|---|---|
| r1 | −520.000 | r1' | ∞ | $d_1$ | 5.6 | $n_1$ | 1.59075 |
| r2 | 188.000 | r2' | ∞ | $d_2$ | 10.2 | | |
| r3 | 400.000 | r3' | −55.000 | $d_3$ | 24.0 | $n_2$ | 1.78972 |
| r4 | −117.826 | r4' | −25.482 | | | | | an entrance pupil position: −24 mm, f: 200 mm, FNo: 100

TABLE 2

(Embodiment 2) of f-θ Lens System

| | | | | | | | |
|---|---|---|---|---|---|---|---|
| r1 | ∞ | r1' | ∞ | $d_1$ | 24.0 | $n_1$ | 1.45305 |
| r2 | 327.358 | r2' | ∞ | $d_2$ | 16.0 | | |
| r3 | ∞ | r3' | −100.000 | $d_3$ | 25.0 | $n_2$ | 1.88420 |
| r4 | −144.114 | r4' | −36.220 | | | | | an entrance pupil position: −24 mm, f: 200 mm, FNo: 100

(Examination of f-θ Characteristic)

FIGS. 3(A) and 4(A) are aberration diagrams for judging the f-θ characteristics of the above embodiments.

Assuming that a focal length in the X plane (direction) of the lens system 4 is f, an incident angle of a beam to the lens is θ, and a distance from a center to a spot position on the scanning surface 5 is an image height h, the f-θ characteristic is defined as the following equation (1):

$$[(h - f\cdot\theta)/f\cdot\theta] \times 100 \qquad (1)$$

This corresponds to a value of an offset amount from an ideal image height in %.

When recording is to be performed on a sheet of, e.g., A-4 size, a scanning direction of a beam is a short side of the A-4 size, i.e., 210 mm. Therefore, if an offset amount of an image position is about ±0.7 mm, almost no distortion is found in an obtained image. That is, an allowable range of the f-θ characteristic can be assumed as ±0.67%. If an offset amount at a given position in the scanning direction is 0 and an offset amount of the image position is divided into positive and negative directions, the total allowable range of the f-θ characteristic corresponding to a required total deflecting angle can be assumed as about 1.34%.

Therefore, according to FIGS. 3(A) and 4(A), the f-θ characteristic of the A-4 size is 1.34% and hence is sufficiently allowable.

(Examination of Image Surface Curvature)

In order that this optical system serves as an f-θ lens system, an image surface must be flat. In general, the image surface curvature can be divided into a sagittal image surface curvature and a meridianal image surface curvature.

An allowable range of the image surface curvature can be replaced with that of a spot system.

An intensity distribution of a cross section of a beam is a Gauss distribution. A minimum diameter portion obtained when a beam is converged by a lens or the like is called a beam waist, and a radius of the beam waist is normally represented by Wo.

Assuming that a beam radius at a position apart from the beam waist by a distance Z is W(z), the following equation is established:

$$W(z) = W_0 \sqrt{1 + (\lambda Z/\pi W_0^2)^2}$$

where $\lambda$ is a wavelength of a laser beam.

Since $a = \{(W(z)/W_0 - 1\} \times 100$, a value of Z for which the beam is increased by a % is obtained as the following equation (2):

$$Z = \pm (\pi W_0^2/\lambda) \sqrt{0.0\, a(2 + 0.0\, a)} \quad (2)$$

Assuming that resolution is 240 dpi, a beam diameter is about 120 μm, and an allowable range of a change in beam diameter is 10%, a=10 is obtained. When this value is substituted in the equation (2), $Z = \pm 6.6$ mm is obtained.

Therefore, the meridional image surface curvature $\Delta M = \pm 6.6$ mm, and the sagittal image surface curvature $\Delta S = \pm 6.6$ mm. Accordingly, if a zero offset position is set for each curvature, the total allowable ranges of both the curvature become about 13.2 mm.

Therefore, according to FIGS. 3(B) and 4(B), $\Delta M$ and $\Delta S$ are both 13.2 mm or less and hence are satisfactory.

As is apparent from FIGS. 3(C) and 4(C), no problem is posed in spherical aberration on a line perpendicular to the scanning line which causes the pitch variations.

What is claimed is:

1. A light beam scanning device in which an f-θ lens system is arranged such that a deflective reflecting surface and a surface to be scanned are set in an optical conjugate relationship, and a linear convergent light beam deflected at a constant angular speed by said deflective reflecting surface is transmitted through said f-θ lens system to be converted at a constant speed and focused on said surface to be scanned to scan said surface, wherein said f-θ lens system comprises a first cylindrical lens located adjacent said deflective reflecting surface and having a refractive power in only a deflection plane, and a second toric lens adjacent an output surface of said first lens, a first surface of said second lens adjacent said first lens having a negative refractive power and a second, opposite surface of said second lens having a positive refractive power in a sectional plane perpendicular to said deflection plane.

2. A device as claimed in claim 1, wherein said first lens has a negative power and said second lens has a positive power in said deflection plane.

3. A device as claimed in claim 1, wherein a refractive index of a lens material of said first lens is set smaller than a refractive index of a lens material of said second lens.

4. A device as claimed in claim 1, wherein said cylindrical lens consists of a plastic lens, a longitudinal dimension of which at the side of said output surface is set to be ¼ or less of a generatrix length of said surface to be scanned.

* * * * *